United States Patent [19]
Peck

[11] Patent Number: 6,015,252
[45] Date of Patent: Jan. 18, 2000

[54] SELF-TAPPING SCREW WITH IMPROVED CUTTING POINT

[76] Inventor: Philip D. Peck, 1524 Meadow Trail, South Bend, Ind. 46614

[21] Appl. No.: 09/252,577

[22] Filed: Feb. 18, 1999

[51] Int. Cl.[7] .............................. F16B 25/00; F16B 35/04
[52] U.S. Cl. ..................................... 411/387.1; 411/387.2; 411/412; 411/418
[58] Field of Search ..................................... 411/386, 394, 411/399, 387.1, 387.2, 412, 413, 418

[56] References Cited

U.S. PATENT DOCUMENTS

| | | | |
|---|---|---|---|
| 1,084,643 | 1/1914 | Lasater | 411/399 |
| 1,651,796 | 12/1927 | Arenz | 411/412 |
| 2,169,408 | 8/1939 | De Vellier | 411/399 X |
| 3,056,234 | 10/1962 | Nelsson et al. | 411/386 X |
| 4,329,099 | 5/1982 | Shimizu et al. | 411/412 |
| 4,621,963 | 11/1986 | Reinwall | 411/386 X |
| 4,834,602 | 5/1989 | Takasaki | 411/386 |
| 5,061,136 | 10/1991 | Dixon et al. | 411/386 X |
| 5,294,227 | 3/1994 | Forster et al. | 411/386 |

FOREIGN PATENT DOCUMENTS

| | | | |
|---|---|---|---|
| 12416 | 10/1889 | United Kingdom | 411/394 |

*Primary Examiner*—Neill Wilson
*Attorney, Agent, or Firm*—Donald J. Ersler

[57] ABSTRACT

A self tapping screw with improved cutting point includes a head, a screw body, a double cutting point, and a washer. A first thread and a second thread are formed on the screw body. The second thread has the same pitch as the first thread and is formed between the first thread. The second thread has a major diameter which is less than the major diameter of the first thread. The first thread starts at substantially a shoulder and continues to a point of the screw body. The second thread starts at substantially the shoulder and continues to the point of the screw body. The shoulder is formed on a bottom of the head. A washer is placed under the shoulder of the head. The rubber washer seals the hole created by the self-tapping screw with improved cutting point. A notch may be included to improve the deburring and drilling ability thereof.

17 Claims, 3 Drawing Sheets

SELF-TAPPING SCREW WITH IMPROVED CUTTING POINT

BACKGROUND OF THE INVENTION

1. Field of the Invention

The present invention relates generally to screws and more specifically to a self-tapping screw with an improved cutting point which provides superior ability to drill through steel sheet preferably for the metal clad wood building industry.

2. Discussion of the Prior Art

Some self tapping screws have a single cutting point that is disposed at a tip of a screw body. The single cutting point allows a user to drill through steel sheet. If a notch is formed in the tip of the screw body, part of the single cutting point will be lost. The notch improves the ability to drill through the steel sheet and deburrs the newly formed hole. An example of a single cutting point screw is found in U.S. Pat. No. 4,329,099 to Shimizu, et al. The cutting point is actually part of the thread which continues to the end of the screw body. The screw has a short second thread which does not continue to the tip. However, the Shimizu, et al. patent does not have a notch; a notch greatly improves the ability to drill through steel sheet. It is also easier to drill through steel with two flutes instead of one. Greater stability is obtained by using two flutes especially when drilling by hand.

Accordingly, there is a clearly felt need in the art for a self-tapping screw with an improved cutting point which has at least one cutting point that continues to the tip and also has a notch to improve the drilling and deburring ability of the self-tapping screw.

SUMMARY OF THE INVENTION

The primary objective of the present invention is to provide a self-tapping screw with an improved cutting point which has at least one cutting point that continues to the tip and also has a notch to improve the drilling and deburring ability of the self-tapping screw.

According to the present invention, a self tapping screw with improved cutting point includes a head, a screw body, a double cutting point, and a washer. A first thread and a second thread are formed on the screw body. The second thread has the same pitch as the first thread and is disposed between the first thread. The second thread has a major diameter which is less than that of the first thread. The first thread continues to the tip of the self-tapping screw and turns to become substantially parallel to the length of the screw body at substantially the tip thereof. The second thread continues to the tip of the self-tapping screw and turns to become substantially parallel to the length of the screw body at substantially the tip thereof. The head is preferably a hex head with a shoulder that is larger than the distance across the points of the hex head. A washer, preferably fabricated from rubber is placed under the shoulder of the head. The rubber washer seals the hole created by the self-tapping screw.

A notch may be included to improve the drilling and deburring ability of the self-tapping screw. The notch has an included angle of substantially 90 degrees which is formed at substantially the tip of the screw body. The notch increases the diameter of the initial hole created by the double threaded point and also deburrs the hole in the steel sheet. The drawback to the notch is that it destroys the cutting point of either the first or second thread. The double cutting point improves the drilling ability of the screw when the notch is not used, but it also allows a notch to be added to the end of the screw body, while retaining the cutting point of either the first or second thread.

Accordingly, it is an object of the present invention to provide a self-tapping screw with improved cutting point which creates a hole with less force than that of the single cutting point prior art self-tapping screws.

It is a further object of the present invention to provide a self-tapping screw with improved cutting point that has a notch at the point thereof to improve the drilling and deburring ability of the self-tapping screw.

It is yet another object of the present invention to provide a self-tapping screw which has a first and second thread which both continue to the point of the screw body.

Finally, it is another object of the present invention to provide a self-tapping screw which has a first thread with a greater major diameter than the second thread to decrease the amount of force needed to thread the self-tapping screw with improved cutting point into a material.

These and additional objects, advantages, features and benefits of the present invention will become apparent from the following specification.

DETAILED DESCRIPTION OF THE PREFERRED EMBODIMENTS

Figure 1:
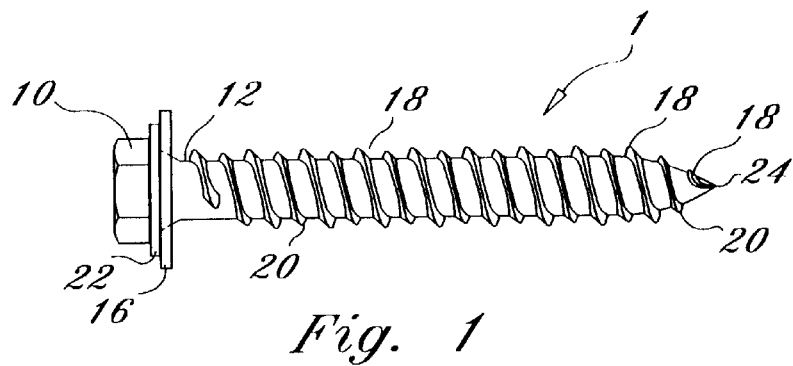
FIG. 1 is a side view of a self-tapping screw with improved cutting point in accordance with the present invention.
Figure 2:
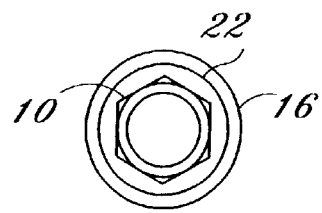
FIG. 2 is an end view of a hex head of a self-tapping screw with improved cutting point in accordance with the present invention.
Figure 3:
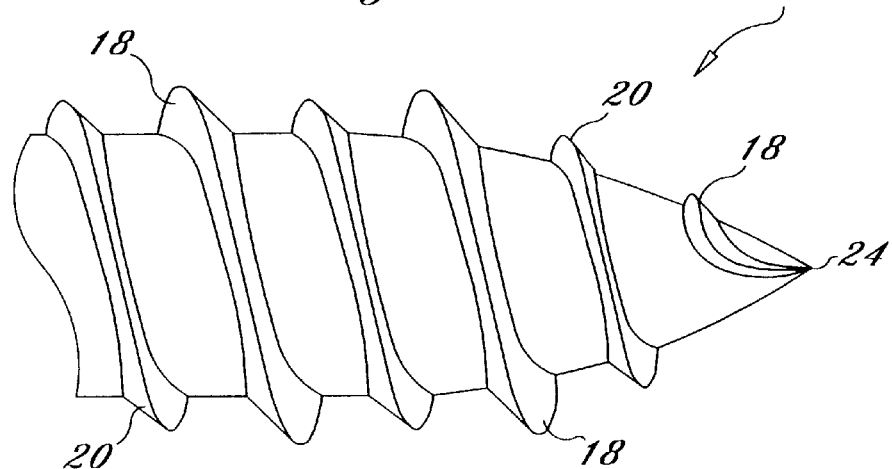
FIG. 3 is an enlarged side view of an end of a self-tapping screw with improved cutting point in accordance with the present invention.
Figure 4:
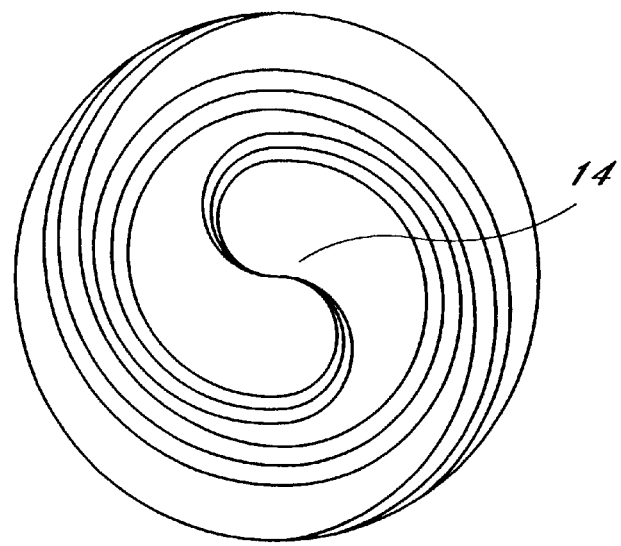
FIG. 4 is an end view of a point of a self-tapping screw with improved cutting point in accordance with the present invention.

With reference now to the drawings, and particularly to FIG. 1, there is shown a side view of a self-tapping screw with improved cutting point 1. With reference to FIGS. 2–4, the self-tapping screw 1 with double cutting point 1 includes a head 10, a screw body 12 a double cutting point 14, and a washer 16. A first thread 18 and a second thread 20 are formed on the screw body 12. The first thread 18 starts at substantially a shoulder 22 of the self-tapping screw 1. The second thread 20 has the same pitch as the first thread 18 and is disposed between the first thread. The major diameter of the second thread 20 is less than the major diameter of the first thread 18. The first thread 18 continues to a tip 24 of the screw body 12 and turns to become substantially parallel to the length of the screw body 12 at substantially the tip 24. The second thread 20 continues to the tip 24 of the screw body 12 and turns to become substantially parallel to the length of the screw body 12 at substantially the tip 24. Two flutes on the self-tapping screw allow sheet metal to be drilled through faster than a single flute. The head 10 is preferably a hex head with a shoulder 22 which is larger than the distance across the corners of the hex head. A washer 16, preferably fabricated from rubber is placed under the shoulder 22 of the head 10.

The smaller major diameter of the second thread 20 has at least two advantages. First, the lower height of the second thread 20 allows the self-tapping screw with improved cutting point 1 to be threaded into a material with less force. The high-low thread design is very important for a user with a battery power screw driver. Less energy is consumed from the battery pack when screwing a self-tapping screw with the high-low thread design. Second, the lower height of the second thread 20 provides greater pull out strength than that of an even height screw. The material is stronger because the screw intrusion of the second thread is reduced.

The following dimensions are given by way of example and not by way of limitation. For a #10 screw, preferably the nominal minor diameter is 0.122 inches; the first thread nominal major diameter is 0.203 inches; and the second thread nominal major diameter is 0.162 inches.

Figure 1A:
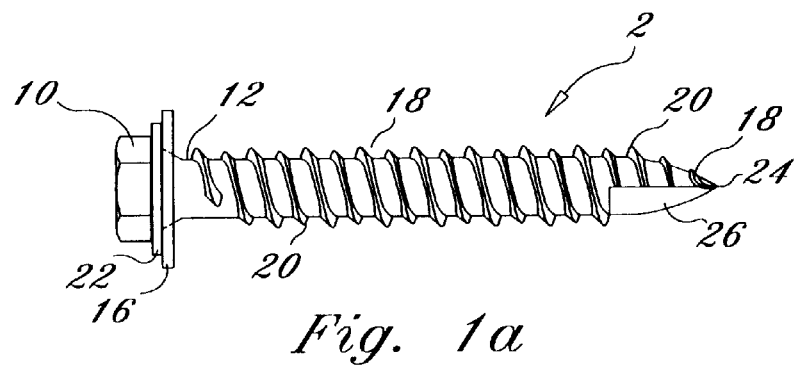
FIG. 1a is a side view of a self-tapping screw with improved cutting point having a notch in accordance with the present invention.
Figure 4A:
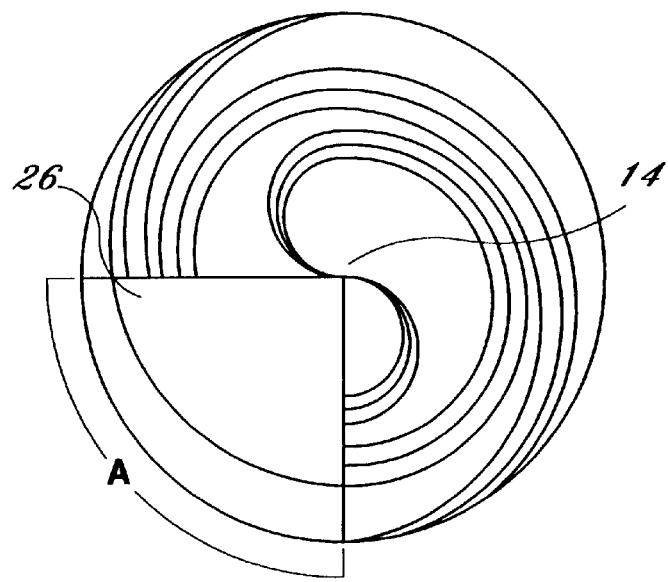
FIG. 4a is an end view of a point of a self-tapping screw with improved cutting point having a notch in accordance with the present invention.

With reference to FIGS. 1a and 4a, a self-tapping screw with improved cutting point and notch 2 is formed when a notch 26 is formed at substantially the tip 24 of the self-tapping screw with improved cutting point 1. The notch 26 improves the drilling and deburring ability of the self-tapping screw with improved cutting point 1. The notch 26 has an included angle A of substantially 90 degrees. The notch 26 is formed at substantially the tip 24 of the screw body 12. The notch 26 increases the diameter of the initial hole by cutting the edge of the initial hole. The notch 26 also helps to deburr the edge of the initial hole. Inclusion of the notch 26 has one major drawback, the notch 26 destroys a portion of either the first or second thread at the tip 24. A cutting edge of either the first or second thread still continues to the tip 24 even with inclusion of the notch 26. With out the notch 26, the self tapping screw will have two cutting flutes which continue to the tip 24.

Figure 5:
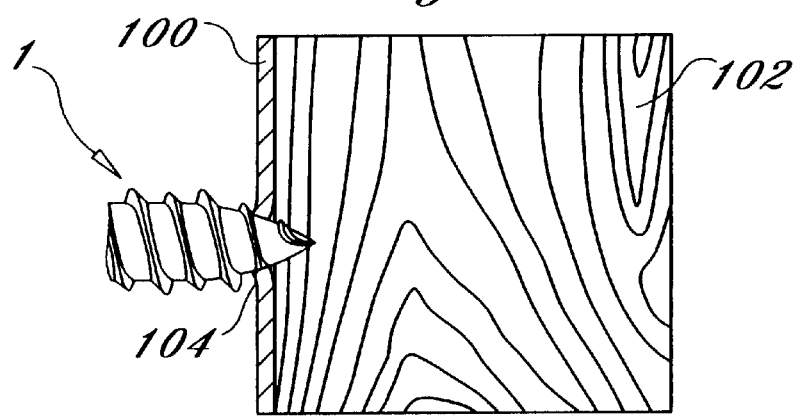
FIG. 5 is a cross sectional view of a self-tapping screw with improved cutting point drilling through steel sheet in accordance with the present invention.
Figure 6:
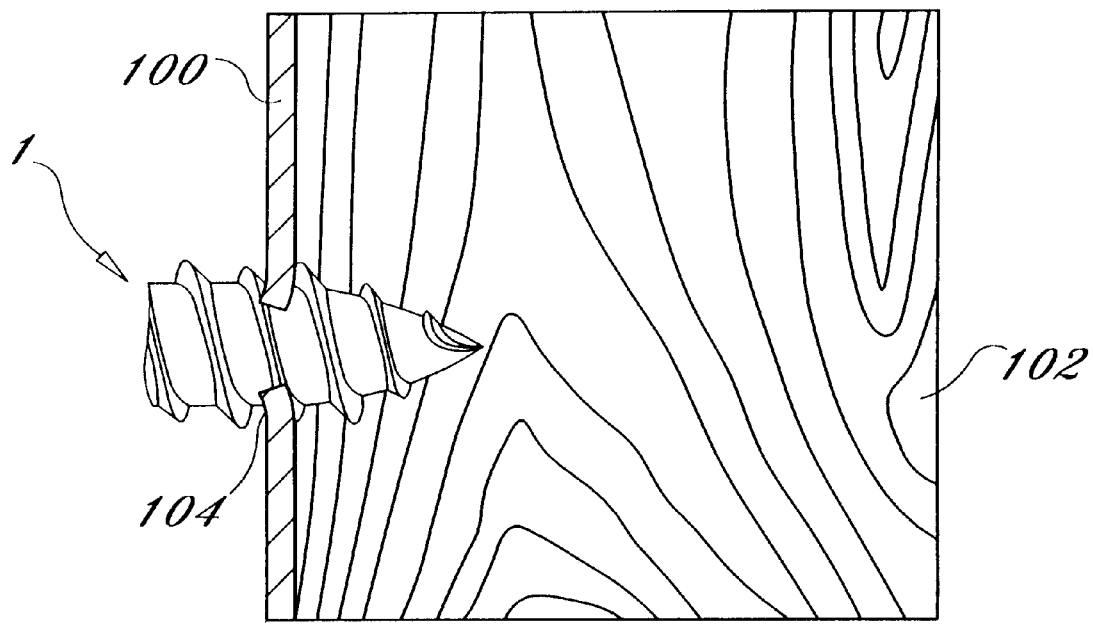
FIG. 6 is a cross sectional view of a self-tapping screw with improved cutting point after forming a hole in sheet steel and threading into a wood material in accordance with the present invention.
Figure 7:
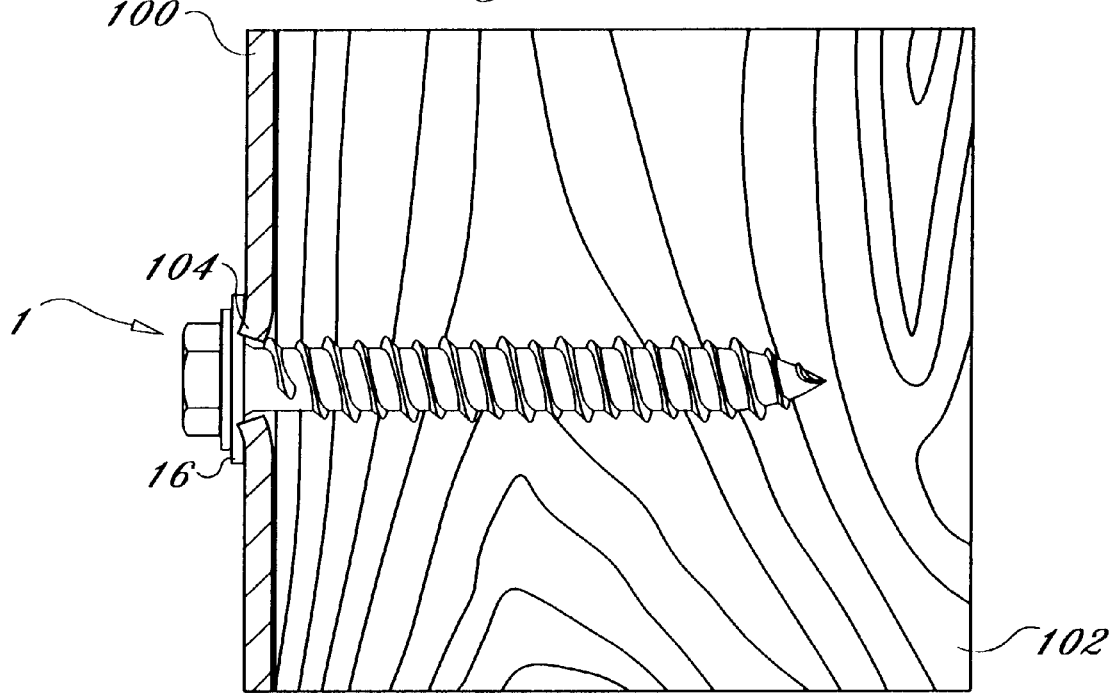
FIG. 7 is a cross sectional view of a self-tapping screw with improved cutting point retaining a piece of sheet steel against a wood frame in accordance with the present invention.

FIG. 5 shows the self-tapping screw with improved cutting point 1 drilling through a steel sheet 100 and threading into a piece of wood 102. The drilling of the steel sheet 100 by the self-tapping screw 1 produces a hole with a small outward facing burr 104. FIG. 6 shows the self-tapping screw with improved cutting point 1 further threaded through the sheet of steel 100 and into the piece of wood 102. The outward facing burr 104 is reduced slightly by the cutting action of the first and second threads. If the self-tapping screw with improved cutting point and notch 2 were used, the outward facing burr 104 would be smaller. FIG. 7 shows a self tapping screw with improved cutting point 1 which retains the steel sheet 100 and the piece of wood 102. The washer 16 seals the hole created by the self-tapping screw with improved cutting point 1 from water leaks.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A self-tapping screw with improved cutting point comprising:

a head;

a screw body extending from said head, said screw body forming a point at an end opposite said head;

a first thread being formed around said screw body from substantially said head to a tip, said first thread turning to become substantially parallel to a length of said screw body at substantially said tip;

a second thread having the same pitch as said first thread, said second thread being formed between said first thread, said second thread turning to become substantially parallel to the length of said screw body at substantially said tip and;

a notch being formed at substantially said tip of said screw body, said notch improving the deburring and drilling ability of said self-tapping screw.

2. The self-tapping screw with improved cutting point of claim 1, wherein:

said second thread having a major diameter which is less than the major diameter of said first thread.

3. The self-tapping screw with improved cutting point of claim 1, further comprising:

said head being a hex head.

4. The self-tapping screw with improved cutting point of claim 1, further comprising:

a shoulder being formed on a bottom of said head.

5. The self-tapping screw with improved cutting point of claim 3, further comprising:

a washer being placed over said screw body such that it contacts said shoulder, said washer sealing a hole created by said self-tapping screw.

6. The self-tapping screw with improved cutting point of claim 5, wherein:

said washer being fabricated from rubber.

7. A self-tapping screw with improved cutting point comprising:

a head;

a screw body extending from said head, said screw body forming a point at an end opposite said head;

a first thread being formed around said screw body from substantially said head to a tip, said first thread turning to become substantially parallel to a length of said screw body at substantially said tip; and a second thread having the same pitch as said first thread, said second thread being formed between said first thread, said second thread turning to become substantially parallel to the length of said screw body at substantially said tip, said second thread having a major diameter which is less than the major diameter of said first thread.

8. The self-tapping screw with improved cutting point of claim 7, wherein:

a notch being formed at said tip of said screw body, said notch improving the deburring and drilling ability of said self-tapping screw.

9. The self-tapping screw with improved cutting point of claim 7, further comprising:

said head being a hex head.

10. The self-tapping screw with improved cutting point of claim 7, further comprising:

a shoulder being formed on a bottom of said head.

11. The self-tapping screw with improved cutting point of claim 10, further comprising:

a washer being placed over said screw body such that it contacts said shoulder, said washer sealing a hole created by said self-tapping screw.

12. The self-tapping screw with improved cutting point of claim 11, wherein:

said washer being fabricated from rubber.

13. A self-tapping screw with improved cutting point and notch comprising:

a head;

a screw body extending from said head, said screw body forming a point at an end opposite said head;

a first thread being formed around said screw body from substantially said head to a tip, said first thread turning to become substantially parallel to a length of said screw body at substantially said tip;

a second thread having the same pitch as said first thread, said second thread being formed between said first thread, said second thread turning to become substantially parallel to the length of said screw body at substantially said tip, said second thread having a major diameter which is less than the major diameter of said first thread; and a notch being formed at said tip of said screw body, said notch improving the deburring and drilling ability of said self-tapping screw.

14. The self-tapping screw with improved cutting point and notch of claim 13, further comprising:

said head being a hex head.

15. The self-tapping screw with improved cutting point and notch of claim 13, further comprising:

a shoulder being formed on a bottom of said head.

16. The self-tapping screw with improved cutting point and notch of claim 15, further comprising:

a washer being placed over said screw body such that it contacts said shoulder, said washer sealing a hole created by said self-tapping screw.

17. The self-tapping screw with improved cutting point and notch of claim 16, wherein:

said washer being fabricated from rubber.

* * * * *